(12) United States Patent
Sharma et al.

(10) Patent No.: US 12,297,360 B2
(45) Date of Patent: May 13, 2025

(54) PERFORMANCE OF LED-CURABLE DIGITAL INK

(71) Applicant: Avery Dennison Retail Information Services LLC, Mentor, OH (US)

(72) Inventors: Pramod Sharma, Ann Arbor, MI (US); Shawn Roberts, South Euclid, OH (US); James Deininger, Highland Heights, OH (US); Michelle Pearce, Chardon, OH (US)

(73) Assignee: Avery Dennison Retail Information Services LLC, Mentor, OH (US)

( * ) Notice: Subject to any disclaimer, the term of this patent is extended or adjusted under 35 U.S.C. 154(b) by 112 days.

(21) Appl. No.: 17/995,593

(22) PCT Filed: Apr. 9, 2021

(86) PCT No.: PCT/US2021/026516
§ 371 (c)(1),
(2) Date: Oct. 6, 2022

(87) PCT Pub. No.: WO2021/207568
PCT Pub. Date: Oct. 14, 2021

(65) Prior Publication Data
US 2023/0151233 A1 May 18, 2023

Related U.S. Application Data

(60) Provisional application No. 63/007,513, filed on Apr. 9, 2020.

(51) Int. Cl.
C09D 11/101 (2014.01)
C09D 133/08 (2006.01)
D06P 1/52 (2006.01)
D06P 5/20 (2006.01)

(52) U.S. Cl.
CPC .......... *C09D 11/101* (2013.01); *C09D 133/08* (2013.01); *D06P 1/5257* (2013.01); *D06P 5/2005* (2013.01)

(58) Field of Classification Search
CPC .... C09D 11/101; C09D 11/322; C09D 133/08
See application file for complete search history.

(56) References Cited

U.S. PATENT DOCUMENTS

| | | | |
|---|---|---|---|
| 4,288,479 A | 9/1981 | Brack | |
| 5,409,504 A | 4/1995 | Fritzsche | |
| 8,940,804 B2 | 1/2015 | Rrahimi | |
| 2013/0295342 A1* | 11/2013 | Araki | C09D 11/30 522/167 |
| 2014/0055544 A1* | 2/2014 | Iraqi | C09D 11/101 522/81 |
| 2016/0264795 A1 | 9/2016 | Asami et al. | |
| 2022/0033606 A1* | 2/2022 | Weinert | C08J 9/141 |

FOREIGN PATENT DOCUMENTS

| | | | |
|---|---|---|---|
| DE | 102014018684 | * | 1/2016 |
| EP | 3632996 | | 4/2020 |
| WO | 2015/031927 | | 3/2015 |
| WO | 2018/165068 | | 9/2018 |

OTHER PUBLICATIONS

Technical Data Sheet of SR492 by Arkema (Year: 2024).*
International Search Report and Written Opinion dated Jun. 30, 2021 issued in corresponding IA No. PCT/US2021/026516 filed Apr. 9, 2021.

* cited by examiner

Primary Examiner — Mark S Kaucher

(57) ABSTRACT

Digital ink formulations that cure by the application of light emitting diode (LED) energy are described. Also described are methods of bonding the LED-curable formulations onto substrates.

19 Claims, 2 Drawing Sheets

PERFORMANCE OF LED-CURABLE DIGITAL INK

CROSS-REFERENCE TO RELATED APPLICATIONS

The present application is a 371 of International Application No. PCT/US2021/026516, which was published in English on Oct. 14, 2021, and claims the benefit of U.S. Provisional Application No. 63/007,513 filed Apr. 9, 2020, the disclosures of which is incorporated by reference herein in their entireties.

FIELD OF THE DISCLOSURE

The present subject matter relates to digital ink formulations that cure by the application of light emitting diode (LED) energy, and methods of bonding the same onto substrates.

BACKGROUND

There is a significant commercial interest for manufacturers to include some distinguishing mark or indicia, such as a design, identifier, and/or the manufacturer's logo or trademark, graphic, or other artwork, on certain substrates, including those on manufactured goods. Such indicia may include vibrant colors and/or unique shapes and are intended to be permanently affixed to the substrates.

The method by which indicia can be included on substrates can vary depending on the substrate, which can include, for example fabrics and textile goods, paper, woods, metals, glass, plastics. Two approaches for printing to substrates, including fabrics, are screen-printing, and heat transfer or digital printing. Depending on the needs of the manufacturer, heat transfer or digital printing may have several advantages compared to screen-printing. Use of digital printing methods, such as ink-jet printing and heat transfer stacking, has reduced the set-up times required to produce an image. Thus digital printing results in reduced costs and turnaround time between short print runs as compared to traditional screen printing. Also, digital printing allows the use of graphic design software to create and manipulate designs much faster than when using a screen-printing process, which may require an entirely new screen to be made in order to accommodate a change to an image. Furthermore, using a digital printer allows the manufacturer to use a variety of inks. According to a conventional approach, digital ink formulations for substrates, including textile goods and fabrics, can include digital inks that can be cured using LED, ultraviolet (UV), heat/thermal, electron beam (EB), and other methods. Manufacturers have found LED-curable ink to be useful because of its reduced amount of volatile organic compounds (VOC's) when compared with other inks since increased VOC's can undesirably cause decreased air quality as well as strong odors.

In some particular applications using LED curing techniques, a substrate, including any fabric, textile goods, or garment, to be labeled or otherwise have indicia imparted thereto is set on a mandrel and the indicia-containing transfer label construction is inverted so that its transfer portion is positioned over the substrate to be treated. When LED curing equipment is employed and the transfer portion is positioned against the substrate, activation and/or curing of the digital printing ink proceeds, typically through a plurality of LED energy applications, until curing has progressed as desired. Any applied support portion is peeled away from the transfer portion, resulting in a labeled substrate. In a typical industrial scale operation, the system may then be advanced so that another transfer portion is aligned with the mandrel, and the process may then be repeated for another substrate.

There remains a need to enhance the performance of LED-curable digital printing inks for substrates, especially in the printing and fabric, textile goods, and garment industries, where such performance is recognized as a considerable challenge. Curing is also recognized as a particular challenge for such LED-curable digital printing ink formulations, and any curing enhancement can positively impact the performance (including but not limited to enhanced washing testing, crock testing and leach testing characteristics), and thus the value of these digital printing inks. Thus, there is a need for improved LED-curable ink formulations.

SUMMARY

The following presents a simplified summary of the disclosure to provide a basic understanding of some embodiments described in the detailed description.

A first aspect of the present disclosure provides a formulation for printing to a substrate, including: a combination of monomers, the combination including each of: at least one mono-acrylated monomer; at least one di-acrylated monomer; and at least one tri-acrylated monomer; wherein a weight ratio of the di-acrylated monomer to the mono-acrylated monomer is from about 2.7 to about 6.0; wherein a weight ratio of the di-acrylated monomer to the tri-acrylated monomer is from about 4.5 to about 8.0; and wherein the formulation is an LED-curable digital ink. In some embodiments, the weight ratio of the di-acrylated monomer to the mono-acrylated monomer is from about 3.0 to about 6.0. In some embodiments, the weight ratio of the di-acrylated monomer to the mono-acrylated monomer is from about 2.7 to about 5.5. In some embodiments, the weight ratio of the di-acrylated monomer to the tri-acrylated monomer is from about 2.7 to about 5.0. In some embodiments, the weight ratio of the di-acrylated monomer to the tri-acrylated monomer range is from about 2.7 to about 4.5. In some embodiments, the combination of monomers further includes at least one polyfunctional alkoxylate, at least one polyalkoxylated acrylate, or a combination thereof. In some embodiments, the mono-acrylated monomer is selected from the group: lauryl acrylate, caprolactam acrylate, isodecyl acrylate, tetra hydrofurfuryl acrylate, cyclic trimethylolpropane formyl acrylate, 4-tert butylcyclohexyl acrylate, or any combination thereof. In some embodiments, the di-acrylated monomer is selected from the group: 1,6 hexanediol ethoxylated diacrylate, 1,6 hexanediol diacrylate (HD), 1,10 deconediol diacrylate, dirpopylene glycol diacrylate, tripropylene glycol diacrylate, or any combination thereof. In some embodiments, the tri-acrylated monomer is selected from the group: trimethylolpropane triacrylate, trimethylolpropane (EO)3 triacrylate, trimethylolpropane (EO)6 triacrylate, trimethylolpropane (EO)9 triacrylate, trimethylolpropane (EO)15 triacrylate, pentaerythritol triacrylate, or any combination thereof. In some embodiments, the formulation further includes at least one of a photoinitiator, a pigment dispersion, a leveling agent, an inhibitor or any combination thereof. In some embodiments, the formulation is LED cured at a power of from about 8 watts to about 20 watts and a wavelength of from about 380 nm to about 400 nm. In some embodiments, the formulation is LED cured at a power of about 20 watts and a wavelength of about 392 nm. In some embodiments, the substrate is selected from the group: fabric, paper, wood, metal, glass, plastic, or any combination thereof. In some embodiments, the substrate is a fabric selected from the group: cotton, nylon, rayon, bamboo, hemp, soy, linen, wool, animal fibers, silk, jute, latex, neoprene, silicone, vinyl, leather, lyocell, polypropylene, or any combination thereof. In some embodiments, the combination of monomers is radically curable.

A second aspect of the present disclosure provides a method of bonding a digital ink formulation onto a substrate, including: at least partially disposing a digital ink formulation having a pattern or an indicia onto a substrate, wherein the digital ink formulation includes a combination of monomers, the combination including each of: at least one monoacrylated monomer; at least one di-acrylated monomer; and at least one tri-acrylated monomer; wherein a weight ratio of the di-acrylated monomer to the mono-acrylated monomer is from about 2.7 to about 6.0; wherein a weight ratio of the di-acrylated monomer to the tri-acrylated monomer is from about 4.5 to about 8.0; and wherein an LED curing of the digital ink formulation on the substrate at least partially transfers the pattern or the indicia to the substrate to provide a modified substrate. In some embodiments, the at least partially disposing includes printing on the substrate. In some embodiments, the substrate is selected from the group: fabric, paper, wood, metal, glass, plastic, or any combination thereof. In some embodiments, the substrate is a fabric. In some embodiments, the fabric is selected from the group: cotton, nylon, rayon, bamboo, hemp, soy, linen, wool, animal fibers, silk, jute, latex, neoprene, silicone, vinyl, leather, lyocell, polypropylene, or any combination thereof. In some embodiments, the digital ink formulation enhances at least one of washing testing performance, dry crock testing performance, wet crock testing performance, or leaching testing performance. In some embodiments, the formulation is LED cured at a power of from about 8 watts to about 20 watts and a wavelength of about 380 nm to about 400 nm. In some embodiments, the formulation is LED cured at a power of about 20 watts and a wavelength of about 392 nm. In some embodiments, the curing of the digital ink formulation is characterized by a total relative enthalpy of at least 90 J/kg. In some embodiments, the curing of the digital ink formulation is characterized by a total relative enthalpy of at least 92 J/kg. In some embodiments, the curing of the digital ink formulation is characterized by a total relative enthalpy of at least 95 J/kg. In some embodiments, the cured digital ink formulation has a total amount of residual monomer of no more than 500 ppm. In some embodiments, the cured digital ink formulation has a total amount of residual monomer of no more than 200 ppm.

A third aspect of the present disclosure provides an article including a fabric substrate modified according to the method of the disclosure.

BRIEF DESCRIPTION OF THE DRAWINGS

These and other features, aspects and advantages are better understood when the following detailed description is read with reference to the accompanying drawings, in which:

FIG. 1B showing a sample after dry crock testing of formulation #5; FIG. 1C showing a sample after wet crock testing of formulation #1; and FIG. 1D showing a sample after wet crock testing of formulation #5;

DETAILED DESCRIPTION

Figure 1A:
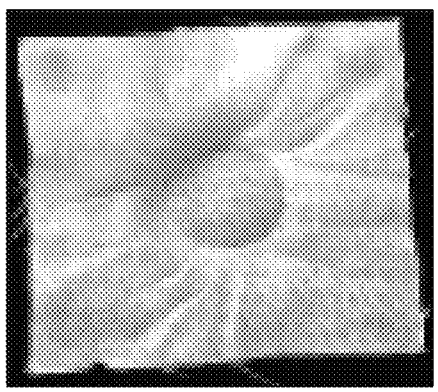
FIGS. 1A, 1B, 1C and 1D illustrate two fabric samples after dry crock testing and wet crock testing, with FIG. 1A showing a sample after dry crock testing of formulation #1.
Figure 1B:
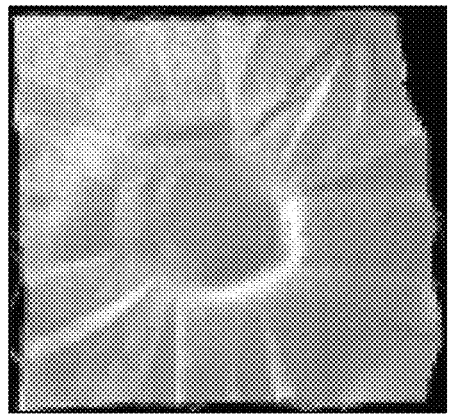
Figure 1C:
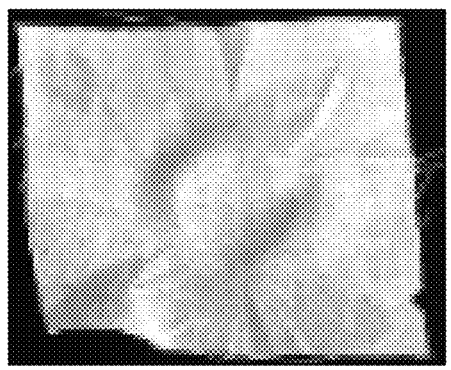

Embodiments will now be described more fully hereinafter with reference to the accompanying drawings, in which example embodiments are shown. Whenever possible, the same reference numerals are used throughout the drawings to refer to the same or like parts. However, this disclosure may be embodied in many different forms and should not be construed as limited to the embodiments set forth herein.

The present disclosure relates to digital ink formulations and methods of bonding the ink formulations to a substrate. In some embodiments of the invention, the substrate is a textile substrate. As noted hereinabove, curing is recognized as a particular challenge for LED-curable digital printing ink formulations, particularly in the field of fabrics. The present disclosure provides a formulation that offers several advantages, including improved curing. In conventional LED-curable digital printing ink formulations, the curing process is generally controlled by adjusting the type and amount of photoinitiators in the formulation. It has unexpectedly been discovered that the curing process can be improved by instead controlling the ratios of mono-acrylated monomer and poly-acrylated monomer in the formulation. As a result, the photoinitiator package can remain unchanged when using the formulations of the disclosure. Thus, the disclosure provides an improved digital ink performance, without requiring the modification of the photoinitiator package of the formulation. The improved curing provides additional performance improvements, such as improvement of at least one of washing testing, crock testing and leach testing performance.

The ink formulations are LED-curable formulations. By "LED-curable" is meant that the formulations can be cured or photopolymerized by the ultraviolet (UV) light emitted by at least one light emitting diode (LED). The LED-curable digital ink formulation, which is suitable for printing to a substrate, includes a combination of monomers, which combination of monomers includes acrylate monomers. In some embodiments, the formulation includes at least one monofunctional acrylate, along with at least one polyfunctional acrylate (for example, at least one di-functional acrylate or at least one tri-functional acrylate, or both). In some embodiments, the combinations of the acrylate monomers can have certain weight ratios of the di-acrylated monomer to the mono-acrylated monomer. In other embodiments, the combinations of the acrylate monomers can have certain weight ratios of the di-acrylated monomer to the tri-acrylated monomer.

The formulation includes "acrylated" monomers. By "acrylated" is meant herein having at least one acrylate functional group per molecule. Acrylated monomers are known to be skin-sensitive. By "skin-sensitive" is meant herein causing irritation or allergic reaction to the skin. The acrylated monomers of the formulation have a reduced skin sensitivity due to their molecular weight. This reduced skin sensitivity is important as any monomer surviving the LED-curing process will remain on the textile, which will then be exposed to the skin during handling or wearing of the textile or a garment made of the textile. Low molecular weight monomers that are skin sensitive, such as for example, methyl methacrylates are not suitable for use in the formulation for textiles as they are not suitable for contact against the skin. In some embodiments the acrylated monomers have a molecular weight of at least 200 g/mol.

In some embodiments, the combination includes each of: (i) at least one mono-acrylated monomer; (ii) at least one di-acrylated monomer; and (iii) at least one tri-acrylated monomer. By "mono-acrylated monomer" is meant herein a monomer having one acrylate functional group per molecule. By "di-acrylated monomer" is meant herein a monomer having two acrylate functional groups per molecule. By "tri-acrylated monomer" is meant herein a monomer having three acrylate functional groups per molecule.

In some embodiments, the LED-curable digital ink formulation has a weight ratio of the di-acrylated monomer to the mono-acrylated monomer of from about 2.7 to about 6. In some embodiments, the LED-curable digital ink formulation has a weight ratio of the di-acrylated monomer to the mono-acrylated monomer of from about 3.0 to about 6. In some embodiments, the weight ratio of the di-acrylated monomer to the mono-acrylated monomer is from 3.0 to 5.5. In some embodiments, the weight ratio of the di-acrylated monomer to the mono-acrylated monomer is from about 3.5 to 5.5. In other embodiments, the weight ratio of the di-acrylated monomer to the mono-acrylated monomer is from about 3.7 to 5.5. In many embodiments, the weight ratio of the di-acrylated monomer to the mono-acrylated monomer is from 2.7 to 6.0, for example, from 2.7 to 5.8, from 2.7 to 5.5, from 2.7 to 5.3, from 2.7 to 5.0, from 2.7 to 4.7, from 2.7 to 4.5, from 2.7 to 4.2, from 2.7 to 4.0, from 3.0 to 5.8, from 3.0 to 5.5, from 3.0 to 5.3, from 3.0 to 5.0, from 3.0 to 4.7, from 3.0 to 4.5, from 3.0 to 4.2, from 3.0 to 4.0, from 3.1 to 6.0, from 3.2 to 6.0, from 3.3 to 6.0, from 3.5 to 6.0, from 3.7 to 6.0, from 4.0 to 6.0, from 4.5 to 6.0, from 5.0 to 6.0, from 3.1 to 5.5, from 3.2 to 5.5, from 3.3 to 5.5, from 3.5 to 5.5, from 3.7 to 5.5, from 4.0 to 5.5, or from 4.5 to 5.5.

In some embodiments, the LED-curable digital ink formulation has a weight ratio of the di-acrylated monomer to the tri-acrylated monomer of from about 4.5 to about 8.0. In some embodiments, the weight ratio of the di-acrylated monomer to the tri-acrylated monomer range is from about 4.5 to about 7.5. In other embodiments, the weight ratio of the di-acrylated monomer to the tri-acrylated monomer range is from about 4.8 to about 7.55. In many embodiments, the weight ratio of the di-acrylated monomer to the tri-acrylated monomer is from 4.5 to 8.0, for example, from 4.5 to 7.8, from 4.5 to 7.6, from 4.5 to 7.4, from 4.5 to 7.2, from 4.5 to 7.0, from 4.5 to 6.3, from 4.5 to 6.0, from 4.5 to 5.7, from 4.5 to 5.5, from 4.7 to 8.0, from 4.9 to 8.0, from 5.1 to 8.0, from 5.3 to 8.0, from 5.5 to 8.0, from 5.7 to 8.0, from 5.9 to 8.0, from 6.1 to 8.0, from 6.3 to 8.0, from 6.6 to 8.0, from 6.9 to 8.0, 4.7 to 7.7, from 4.9 to 7.7, from 5.1 to 7.7, from 5.3 to 7.7, from 5.5 to 7.7, from 5.7 to 7.7, from 5.9 to 7.7, from 6.1 to 7.7, from 6.3 to 7.7, or from 6.6 to 7.7.

In some embodiments, the LED-curable digital ink formulation has a weight ratio of the di-acrylated monomer to the mono-acrylated monomer of from about 2.7 to about 6.0 and a weight ratio of the di-acrylated monomer to the tri-acrylated monomer of from about 4.5 to about 8.0.

Any suitable mono-acrylated, di-acrylated monomer or tri-acrylated monomer can be used in the formulation. In many embodiments, the mono-acrylated monomer is lauryl acrylate (LA), caprolactam acrylate, isodecyl acrylate, tetra hydrofurfuryl acrylate, cyclic trimethylolpropane formyl acrylate, 4-tert butylcyclohexyl acrylate, or any combination thereof. In some embodiments, the mono-acrylated monomers have a molecular weight of at least 200 g/mol.

In many embodiments, the di-acrylated monomer is 1,6 hexanediol ethoxylated diacrylate, 1,6 hexanediol diacrylate, 1,10 deconediol diacrylate, dirpopylene glycol diacrylate, tripropylene glycol diacrylate, or any combination thereof. In some embodiments, the di-acrylated monomers have a molecular weight of at least 225 g/mol. In some embodiments, the di-acrylated monomers have a molecular weight of at least 230 g/mol. In some embodiments, the di-acrylated monomers have a molecular weight of at least 240 g/mol. In some embodiments, the di-acrylated monomers have a viscosity at 25° C. of from about 0.5 to about 30 mPa. In some embodiments, the di-acrylated monomers have a viscosity at 25° C. of from about 1 to about 25 mPa. In some embodiments, the di-acrylated monomers have a viscosity at 25° C. of from about 2 to about 20 mPa. In some embodiments, the di-acrylated monomers include from 0 to 500 ppm of an inhibitor, such as for example hydroquinone monomethyl ether (MEHQ). In some embodiments, the di-acrylated monomers have an acid value of less than 0.7 kOH/g. In some embodiments, the di-acrylated monomers have an acid value of less than 0.6 kOH/g. In some embodiments, the di-acrylated monomers have an acid value of less than 0.5 kOH/g.

In many embodiments, the tri-acrylated monomer is trimethylolpropane triacrylate, trimethylolpropane (EO)3 triacrylate, trimethylolpropane (EO)6 triacrylate, trimethylolpropane (EO)9 triacrylate, trimethylolpropane (EO)15 triacrylate, pentaerythritol triacrylate, or any combination thereof. In some embodiments, the tri-acrylated monomers have a molecular weight of at least 275 g/mol. In some embodiments, the tri-acrylated monomers have a molecular weight of at least 285 g/mol. In some embodiments, the tri-acrylated monomers have a molecular weight of at least 295 g/mol. In some embodiments, the tri-acrylated monomers have a viscosity at 25° C. of from about 20 to about 150 mPa. In some embodiments, the tri-acrylated monomers have a viscosity at 25° C. of from about 60 to about 140 mPa. In some embodiments, the tri-acrylated monomers have a viscosity at 25° C. of from about 70 to about 130 mPa. In some embodiments, the tri-acrylated monomers include from 0 to 500 ppm of an inhibitor, such as for example hydroquinone monomethyl ether (MEHQ). In some embodiments, the tri-acrylated monomers have an acid value of less than 0.4 kOH/g. In some embodiments, the tri-acrylated monomers have an acid value of less than 0.3 kOH/g. In some embodiments, the tri-acrylated monomers have an acid value of less than 0.2 kOH/g.

In some embodiments, the LED-curable digital ink formulation also includes at least one polyfunctional alkoxylate or at least one polyalkoxylated acrylate, or a combination thereof.

The LED-curable digital ink formulation can further include any suitable additive. In some embodiments, the LED-curable digital ink formulation for printing to a substrate further includes at least one of a photoinitiator, a pigment dispersion, a leveling agent, an inhibitor, or any combination thereof. In some embodiments, the photoinitiator is diphenyl(2,4,6 trimethylbenzoyl)phosphine oxide (TPO), diethoxyacetophenone (DEAP), dimethoxyphenylacetophenone, benzoylcyclohexanol, hydroxydimethylacetophenone, 2,4-diethylthioxanthone (DETX), isopropylthioxanthone (ITX), bis-acylphosphine oxide (BAPO), or any combination thereof. In some embodiments, the pigment dispersion is a cyan pigment dispersion, black pigment dispersion, magenta pigment dispersion, yellow pigment dispersion, or any combination thereof. In some embodiments, the pigment dispersion is a cyan pigment dispersion.

In some embodiments, the leveling agent is polyether siloxane copolymer, silicone acrylate copolymer, polydimethylsiloxane, or any combination thereof. In some embodiments, the inhibitor is a UV inhibitor. In some embodiments, the inhibitor is Irgastab UV 22™ (available from BASF Group, Germany), Omnistab UV 384-2™, Omnistab UV 1130™, Omnistab UV 028™, Omnistab UV 400™, (all available from IGM Resins, China), or any combination thereof. In many embodiments, the inhibitor is capable of at least one of inhibiting polymerization of UV ink, or increasing the shelf life of the ink, such as for example, Irgastab UV 22. In some embodiments, the inhibitor is present in an amount of from 0.01 to 3 weight percent, based on the weight of the formulation.

Photoinitiators are compounds that produce radicals when exposed to UV light. These radicals then react with monomers to initiate to polymerization of the LED-curable acrylated monomers during the curing process. Any suitable photoinitiator can be used with the formulation. Examples of suitable photoinitiators include, but are not limited to Norrish Type II (such as, for example 2,4-diethylthioxanthone (DETX)), a monoacylphosphine oxide based photoinitiator (such as, for example diphenyl(2,4,6-trimethylbenzoyl) phosphine oxide (TPO)), bis (2,4,6 trimethylbenzoyl phenylphospine oxide (BAPO), diethoxyacetophenone (DEAP), dimethoxyphenylacetophenone, isopropylthioxanthone (ITX), or any combination thereof. In some embodiments of the disclosure, the formulation further includes 2,4-diethylthioxanthone (DETX), diphenyl(2,4,6-trimethylbenzoyl)phosphine oxide (TPO)), bis (2,4,6 trimethylbenzoyl phenylphospine oxide (BAPO), diethoxyacetophenone (DEAP), dimethoxyphenylacetophenone, isopropylthioxanthone (ITX), or any combination thereof. In some embodiments of the disclosure, the formulation further includes a diphenyl(2,4,6-trimethylbenzoyl)phosphine oxide (TPO), 2,4-Diethylthioxanthone (DETX), bis (2,4,6 trimethylbenzoyl phenylphospine oxide (BAPO) photoinitiator, or any combination thereof. In some embodiments, the formulation is a cyan ink containing a diphenyl(2,4,6-trimethylbenzoyl) phosphine oxide photoinitiator. In some embodiments, the photoinitiator package includes a (bis(2,4,6 trimethylbenzoyl phenylphosphine oxide) (BAPO) photoinitiator in an amount of from 7 to 50 weight percent, based on the total weight of the photoinitiator package.

Photoinitiators are typically present in a photoinitiator package. These photoinitiator packages include at least one photoinitiator, and can include additional components, such as for example sensitizers or electron donors (synergists). Any suitable photoinitiator can be in the photoinitiator package. In some embodiments, the photoinitiator package includes a photoinitiator, such as for example diphenyl(2,4, 6-trimethylbenzoyl)phosphine oxide (TPO), in an amount of from 55 to 75 weight percent, based on the total weight of the photoinitiator package. Depending on the type of photoinitiator used, the formulation may not need to include a synergist. In some embodiments, the formulation does not include a synergist. Synergists help photoinitiators to perform their function, however, their use may disadvantageously cause a shortened life of the formulation, and may also cause agglomeration of the formulation, which can cause blocking of the printer nozzles. In some embodiments, the formulation includes no synergist. In some embodiments, the formulation includes a diphenyl(2,4,6-trimethylbenzoyl)phosphine oxide (TPO) photoinitiator, or a 2,4-diethylthioxanthone (DETX) photoinitiator, or both, and no synergist.

In many embodiments, the LED-curable digital ink formulation for printing to a substrate is LED cured at a power of from about 8 watts to about 20 watts. In some embodiments, the LED-curable digital ink formulation is LED cured at a power of about 20 watts. In some embodiments, the LED-curable digital ink formulation is LED cured at a power of from about 12 watts to about 20 watts. In some embodiments, the LED-curable digital ink formulation is LED cured at a power of from about 15 watts to about 20 watts. In some embodiments, the LED-curable digital ink formulation is LED cured at a wavelength of from about 380 nm to about 400 nm. In some embodiments, the LED-curable digital ink formulation is LED cured at a wavelength of about 392 nm. In some embodiments, the LED-curable digital ink formulation is LED cured at a wavelength of from about 385 nm to about 395 nm.

In many embodiments, the LED-curable digital ink formulation for printing to a substrate is LED cured at a power of from about 8 watts to about 20 watts and a wavelength of from about 380 nm to about 400 nm. In some embodiments, the LED-curable digital ink formulation for printing to a substrate is LED cured at a power of about 20 watts and a wavelength of about 392 nm. In some embodiments, the LED-curable digital ink formulation for printing to a substrate is LED cured at a power of from about 12 watts to about 20 watts and a wavelength of from about 380 nm to about 400 nm. In some embodiments, the LED-curable digital ink formulation for printing to a substrate is LED cured at a power of from about 15 watts to about 20 watts and a wavelength of from about 385 nm to about 395 nm. Different LED curing watts and wavelengths are also contemplated.

The digital ink formulations of the present disclosure may be formulated to be LED curable. The LED-curable digital ink can be used on any suitable substrate. In many embodiments, the substrate for the LED-curable digital ink formulation is fabric, paper, wood, metal, glass, plastic, or any combination thereof. In some embodiments, the fabric is, or is a component of, a textile good, garment or piece of clothing. In some embodiments, the fabric may be cotton, nylon, rayon, bamboo, hemp, soy, linen, wool or other animal fibers, silk, jute, latex, neoprene, silicone, vinyl, leather, lyocell, polypropylene, or any combination thereof. The nature of the substrate may vary without departing from the scope of the present disclosure. For example, in some embodiments, the fabric may include a polyester and a minor proportion of a stretch fabric component such as a spandex fabric. In one embodiment, a fabric may be from about 90% to about 97% polyester and from about 3% to about 10% a stretch fabric. By "stretch fabric" is meant herein a fabric that has the ability to stretch in at least one direction. The stretch can be provided, for example, by the inclusion of elastic fibers in the fabric, such as for example lycra, elastane, spandex or combinations thereof, by the method of production of the fabric, such as for example looping, or by any other suitable method. In yet another embodiment, the fabric may be about 95% polyester and about 5% spandex. In another embodiment, the fabric may be entirely made of a polyester. In some embodiments, the paper may be printed paper, tissue paper, coated paper, paperboard, fine art paper, cardboard, craft paper, newsprint, or any combination thereof. In some embodiments, the wood may be oak, maple, cedar, cherry, birch, pine, walnut, or any combination thereof. In some embodiments, the metal may be iron, steel, aluminum, copper, magnesium, titanium, gold, silver, zinc, bronze, brass, nickel, tin, lead, silicon, tungsten, cobalt, or any combination thereof. In some embodiments, the glass may be annealed glass, tempered glass, laminated glass, or any combination thereof. In some embodiments, the plastic may be high-density polyethylene, low-density polyethylene, polypropylene, polyethylene terephthalate, polyvinyl chloride, polystyrene, or any combination thereof.

In some embodiments, the combination of monomers is radically curable. By "radically curable" is meant herein having at least one free-radically crosslinkable group that can form a network via a radical (co)polymerization. In some embodiments, the combination of monomers, namely (i) at least one mono-acrylated monomer; (ii) at least one di-acrylated monomer; and (iii) at least one tri-acrylated monomer, may be radically curable. Examples of suitable mono-acrylated monomers that are radically curable include, but are not limited to, lauryl acrylate, caprolactam acrylate, isodecyl acrylate, tetra hydrofurfuryl acrylate, cyclic trimethylolpropane formal acrylate, 4-tert butylcyclohexyl acrylate, or any combination thereof. Examples of suitable di-acrylated monomers that are radically curable include, but are not limited to 1,6 hexanediol ethoxylated diacrylate, 1,6 hexanediol diacrylate (HD), 1,10 Deconediol diacrylate, dirpopylene glycol diacrylate, tripropylene glycol diacrylate, or any combination thereof. Examples of suitable tri-acrylated monomers that are radically curable include, but are not limited to, trimethylolpropane triacrylate (TMPTA), trimethylolpropane (EO)3 triacrylate, trimethylolpropane (EO)6 triacrylate, trimethylolpropane (EO)9 triacrylate, trimethylolpropane (EO)15 triacrylate, pentaerythritol triacrylate, and any combination thereof.

The LED-curable printing ink formulation of the disclosure may be applied to, or laid down on, a substrate by generally known methods and equipment. Typically, digital printing equipment will be employed when using these printing inks. The nature, structure and details of same may vary without departing from the scope of the present disclosure. The LED-curable printing ink formulation of the disclosure is suitable for systems, methods and applications in respect of which an LED-curable ink is used, particularly for systems, methods and applications where at least one of enhanced curing or improved performance characteristics of the LED-cured ink are desired or required. These performance characteristics may be measured by way of, for example, washing testing, crock testing, leaching resistance testing, overall curing effectiveness, and combinations thereof.

In some embodiments, the digital ink formulation of the disclosure is a digital ink formulation having a pattern or an indicia. In digital printing, computer software is used to design a pattern or indicia, and the digital ink is printed onto a substrate so that the ink is deposited in accordance with that pattern or indicia. By "having a pattern or indicia" is meant herein that the digital ink formulation is deposited in a particular configuration so that it forms the shape of a pre-designed pattern or indicia upon deposition on a substrate. In some embodiments, the digital ink formulation having a pattern or an indicia is at least partially disposed onto a substrate. The substrate may be positioned in a certain manner to receive the deposition of the digital ink formulation. The ink formulations of the disclosure are particularly suitable for printing on desired substrates. Many substrates may be particularly problematic upon which to print indicia, and the ink formulations of the present disclosure are especially well suited for these types of applications.

The digital ink formulations of the present disclosure are suitable for use in a method of bonding a digital ink formulation having a pattern or an indicia onto a substrate. The digital ink formulation having a combination of acrylate monomers is used in the method. In some embodiments, the combination includes acrylate monomers including at least one monofunctional acrylate and at least two polyfunctional acrylates. In some embodiments, the combination includes each of at least one mono-acrylated monomer, at least one di-acrylated monomer, and at least one tri-acrylated monomer as described herein. In some embodiments, the combination of monomers further includes a polyfunctional alkoxylate or polyalkoxylated acrylate, or any combination thereof. Examples of suitable monomers are described hereinabove.

In many embodiments, the method of bonding a digital ink formulation having a pattern or an indicia onto a substrate using the LED-curable digital ink formulation described herein is provided. In some embodiments, the method of bonding the digital ink formulation includes at least partially disposing a digital ink formulation onto a substrate. In some embodiments, the formulation has a pattern or indicia. By "at least partially disposing" is meant herein that at least a portion, or all of a digital ink formulation is disposed on the substrate. The digital ink formulation can be disposed on the substrate by any suitable method, such as for example, by printing on the substrate. The digital ink formulation can be made of any of the combinations of monomers as described above. In some embodiments, the digital ink formulation includes a combination of monomers including each of: (i) at least one mono-acrylated monomer; (ii) at least one di-acrylated monomer; and (iii) at least one tri-acrylated monomer. In some embodiments, the combination includes acrylate monomers including at least one monofunctional acrylate and at least two polyfunctional acrylates. In some embodiments, the combination includes each of at least one mono-acrylated monomer, at least one di-acrylated monomer, and at least one tri-acrylated monomer as described herein. In some embodiments, the combination of monomers further includes a polyfunctional alkoxylate or polyalkoxylated acrylate, or any combination thereof. An LED curing of the digital ink formulation on the substrate is performed. The LED curing can be performed by any suitable LED curing method, several of which are well known in the art. This LED curing results in at least a partial transfer of the digital ink formulation pattern or the indicia to the substrate. By "transfer" is meant herein a securing of the formulation to the substrate via the polymerization of the monomers in the formulation. A partial transfer can occur, for example, when the formulation is not completely cured, resulting in the presence of some residual monomer. In some embodiments, the curing results in a pattern or indicia that is substantially fully transferred onto the substrate. The substrate surface is modified by the LED cured digital ink pattern or the indicia disposed thereupon. The pattern or indicia may be, or may include an informational message, design, notice, label or any other indicia that had been selected or created by the user or manufacturer. Thus, the methods of the disclosure provide an LED-curable digital ink formulation that is positioned at a desired location, in order to provide a substrate having a pattern or indicia transferred thereto.

As noted herein-above, in some embodiments, after curing, some residual monomer remains. With conventional digital ink formulations, the amount of residual monomer can be high, such as for example greater than 1000 ppm. The formulation of the disclosure results in lower amounts of residual monomer, due to the enhanced curing capability of the formulation. In some embodiments, the cured formulation contains less than 500 ppm of residual monomer. In some embodiments, the cured formulation contains less than 400 ppm, less than 300 ppm, less than 200 ppm, or less than 170 ppm of residual monomer.

In many embodiments, the substrate is fabric, paper, wood, metal, glass, plastic, or any combination thereof. In some embodiments, the substrate is fabric, such as for example cotton, nylon, rayon, bamboo, hemp, soy, linen, wool or other animal fibers, silk, jute, latex, neoprene, silicone, vinyl, leather, lyocell, polypropylene, polyester, or any combination thereof. In some embodiments, the paper may be printed paper, tissue paper, coated paper, paperboard, fine art paper, cardboard, craft paper, newsprint, or any combination thereof. In some embodiments, the wood may be oak, maple, cedar, cherry, birch, pine, walnut, or any combination thereof. In some embodiments, the metal may be iron, steel, aluminum, copper, magnesium, titanium, gold, silver, zinc, bronze, brass, nickel, tin, lead, silicon, tungsten, cobalt, or any combination thereof. In some embodiments, the glass may be annealed glass, tempered glass, laminated glass, or any combination thereof. In some embodiments, the plastic may be high-density polyethylene, low-density polyethylene, polypropylene, polyethylene terephthalate, polyvinyl chloride, polystyrene, or any combination thereof.

In many embodiments, the digital ink formulation described herein has at least one improved property over conventional digital ink formulations. Thus, the present disclosure provides for enhanced performance in at least one area, such as for example maintenance after multiple washings, improved resistance to abrasion encounters, and decreased leaching out of color, all of which are difficult challenges faced when employing LED-curable printing inks, especially when they are printed on substrates such as polyester textiles or fabric goods. Further, the substrate according to the method may exhibit, by virtue of use of the LED-curable digital ink formulation described herein, improvements in at least one of washing testing, dry crock testing, wet crock testing and leaching testing performance.

In some embodiments, the digital ink formulation described herein enhances washing testing performance under the Nike Test Method. By "enhances wash testing performance" is meant herein that the formulation provides at least a one digit improvement on a color-to-fade scale ranging from 0 (all color lost) to 5 (no fade) over conventional formulations. In some embodiments, the digital ink formulation described herein enhances dry crock testing performance under the Association of Textile Chemists and Colorists (AATCC) Test Manual's Test AATCC TM8: Test Method for Colorfastness to Crocking: Crockmeter Method. By "enhances dry crock testing performance" is meant herein that the formulation provides a lower color difference (Delta-E ($\Delta E$)), after undergoing AATCC TM8, as measured by a spectrophotometer, than the color difference of a conventional formulation. In some embodiments, the digital ink formulation described herein enhances wet crock testing performance, as measured by Association of Textile Chemists and Colorists (AATCC) Test Manual's Test AATCC TM8: Test Method for Colorfastness to Crocking: Crockmeter Method. By "enhances wet crock testing performance" is meant herein that the formulation provides a lower color difference (Delta-E ($\Delta E$)), after undergoing AATCC TM8, as measured by a spectrophotometer, than the color difference of a conventional formulation. In some embodiments, the digital ink formulation described enhances leaching testing performance, under a leaching test in which a sample having the dimensions of 2.54 cm (1 inch) by 2.54 cm (1 inch), is coated with an LED-cured digital ink formulation, and is then soaked for 30 seconds in 20 grams of THF (tetrahydrofuran), whereupon the amount of color leaching is observed. By "enhances leaching testing performance" is meant herein that the formulation provides at least a one digit improvement (i.e. reduction of color leaching) on a leaching scale ranging from 0 (significant leaching of colors) to 5 (no leaching of colors).

In many embodiments, the LED-curable digital ink formulation for printing to a substrate is LED cured at a power of from about 8 watts to about 20 watts. In some embodiments, the LED-curable digital ink formulation is LED cured at a power of about 20 watts. In some embodiments, the LED-curable digital ink formulation is LED cured at a power of from about 12 watts to about 20 watts. In some embodiments, the LED-curable digital ink formulation is LED cured at a power of from about 15 watts to about 20 watts. In some embodiments, the LED-curable digital ink formulation is LED cured at a wavelength of from about 380 nm to about 400 nm. In some embodiments, the LED-curable digital ink formulation is LED cured at a wavelength of about 392 nm. In some embodiments, the LED-curable digital ink formulation is LED cured at a wavelength of from about 385 nm to about 395 nm.

In some embodiments of the method, the LED-curable digital ink formulation for printing to a substrate is LED cured at from about 8 watts to about 20 watts and a wavelength of from about 380 nm to about 400 nm. In some embodiments, the LED-curable digital ink formulation for printing to a substrate is LED cured at about 20 watts and a wavelength of about 392 nm. In some embodiments, the LED-curable digital ink formulation for printing to a substrate is LED cured at from about 12 watts to about 20 watts and a wavelength of from about 380 nm to about 400 nm. In some embodiments, the LED-curable digital ink formulation for printing to a substrate is LED cured at from about 15 watts to about 20 watts and a wavelength of from about 385 nm to about 395 nm. Different LED curing watts and wavelengths are also contemplated.

In some embodiments, the method described herein may enhance curing of the LED-curable digital ink formulations. Such curing can be shown according to photo DSC (differential scanning calorimeter) analysis with a 365 nm LED light source during the LED curing using LED light energy. In some embodiments, the curing of the digital ink formulation may be characterized by a total relative enthalpy of at least 90 J/kg. In some embodiments, the curing of the digital ink formulation is characterized by a total relative enthalpy of at least 92 J/kg. In some embodiments, the curing of the digital ink formulation is characterized by a total relative enthalpy of at least 95 J/kg. In some embodiments, the curing of the digital ink formulation is characterized by a total relative enthalpy of at least 96 J/kg.

This disclosure also provides articles including a substrate that has been modified by the methods of the disclosure, as described hereinabove. In some embodiments, the substrate is a fabric. In some embodiments, the article is a piece of clothing.

While different embodiments of the LED-curable digital ink formulations, and methods of using same are described, skilled artisans will understand that any of the features of one embodiment can be incorporated into the other embodiments. Any combination of features or steps described in any of the embodiments can be included in the LED-curable digital ink formulations and methods, and are within the scope of the invention.

It will be understood that various details of the presently disclosed subject matter may be changed without departing from the scope of the presently disclosed subject matter.

Furthermore, the foregoing description if for the purpose of illustration only, and not for the purpose of limitation.

EXAMPLES

Performance Testing

Examples 1-24—Formulation Preparation

Formulations were prepared including each of: (i) at least one mono-acrylated monomer; (ii) at least one di-acrylated monomer; and (iii) at least one tri-acrylated monomer. Table 1 shows examples of the weight ratios of di-acrylated monomer to mono-acrylated monomer, and di-acrylated monomer to tri-acrylated monomer for the LED-curable digital ink formulations according to the disclosure, and ranges for comparative example. The formulations according to the disclosure had both the ratio of di-acrylated monomer to mono-acrylated monomer and the ratio of di-acrylated monomer to tri-acrylated monomer shown in Range 2.

TABLE 1

Weight Ratios

| Monomer Type | Comparative Range 1 | Range 2 | Comparative Range 3 |
|---|---|---|---|
| di-acrylated monomer to mono-acrylated monomer | >6.1 | 2.7-6.0 | <2.7 |
| di-acrylated monomer to tri-acrylated monomer | >9.5 | 4.5-8.0 | <4.5 |

Table 2 details Formulation 1 through Formulation 12, which were examples of formulations according to the present disclosure, as well as comparative formulations that were not according to the present disclosure. Each formulation included at least one mono-acrylated monomer, at least one di-acrylated monomer, at least one tri-acrylated monomer, at least one photoinitiator, at least one leveling agent and at least one inhibitor. Table 2 shows the amounts (in weight percent) of each. In the heading of Table 2, certain formulations are identified according to the weight percentage difference (when compared with reference Formulation #1) of the mono-acrylated monomer, di-acrylated monomer, and tri-acrylated monomer for each particular formulation.

More specifically, as indicated in the heading:

Formulation #1 was the reference formulation;

Formulation #2 contained 20 weight percent less of the mono-acrylated monomer (LA) present in Formulation #1;

Formulation #3 contained 20 weight percent more of the mono-acrylated monomer present in Formulation #1;

Formulation #4 contained 20 weight percent less of the di-acrylated monomer (HD) present in Formulation #1;

Formulation #5 contained 20 weight percent more of the di-acrylated monomer present in Formulation #1;

Formulation #6 contained 20 weight percent less of the tri-acrylated monomer (TM) present in Formulation #1;

Formulation #7 contained 20 weight percent more of the tri-acrylated monomer present in Formulation #1;

Formulation #8 contained half of the mono-acrylated monomer, 20 weight percent more of the di-acrylated monomer, and the same amount of tri-acrylated monomer present in Formulation #1;

Formulation #9 contained the same amount of the mono-acrylated monomer, 20 weight percent more of the di-acrylated monomer, and half of tri-acrylated monomer present in Formulation #1;

Formulation #10 contained a reduced amount of the mono-acrylated monomer, 20 weight percent more of the di-acrylated monomer, and half of the tri-acrylated monomer present in Formulation #1;

Formulation #11 contained a reduced amount of the mono-acrylated monomer, 20 weight percent more of the di-acrylated monomer, and the same amount of the tri-acrylated monomer present in Formulation #1; and Formulation #12 contained a reduced amount of the mono-acrylated monomer, 20 weight percent more of the di-acrylated monomer, and a reduced amount of the tri-acrylated monomer present in Formulation #1.

TABLE 2

Formulations

| | Comp. 1 | Comp. 2 | Comp. 3 | Comp. 4 | Example 5 | Comp. 6 | Comp. 7 | Comp. 8 | Comp. 9 | 10 | 11 | 12 |
|---|---|---|---|---|---|---|---|---|---|---|---|---|
| Formulations | #1 | #2 | #3 | #4 | #5 | #6 | #7 | #8 | #9 | #10 | #11 | #12 |
| Ingredient | Ref.-1 | 20% LA Less | 20% LA More | 20% HD Less | 20% HD More | 20% TMPTA Less | 20% TMPTA More | LA-Half HD-20% More TMPTA-Same | LA-Same HD-20% More TMPTA-Half | LA-Reduced HD-20% More TMPTA-Half | LA-Reduced HD-20% More TMPTA-same | LA-Reduced HD-20% More TMPTA-Reduced |
| Monol Acrylate | 17.89 | 14.31 | 21.47 | 17.89 | 17.89 | 17.89 | 17.89 | 8.95 | 17.89 | 10.77 | 10.77 | 10.77 |
| Di-acrylate Monomer | 46.15 | 46.15 | 46.15 | 36.92 | 55.38 | 46.15 | 46.16 | 55.38 | 55.38 | 57.2 | 57.2 | 57.2 |
| Triacrylate Monomer | 11.54 | 11.54 | 11.54 | 11.54 | 11.54 | 9.232 | 13.58 | 11.54 | 5.77 | 7.59 | 11.54 | 9.50 |
| Oligomer | 0.96 | 0.96 | 0.96 | 0.96 | 0.96 | 0.96 | 0.96 | 0.96 | 0.96 | 0.96 | 0.96 | 0.96 |
| Cyan Pigment | 9.62 | 9.62 | 9.62 | 9.62 | 9.62 | 9.62 | 9.62 | 9.62 | 9.62 | 9.62 | 9.62 | 9.62 |
| Photoinitiator-1 | 8.65 | 8.65 | 8.65 | 8.65 | 8.65 | 8.65 | 8.65 | 8.65 | 8.65 | 8.65 | 8.65 | 8.65 |
| Photoinitiator-2 | 2.88 | 2.88 | 2.88 | 2.88 | 2.88 | 2.88 | 2.88 | 2.88 | 2.88 | 2.88 | 2.88 | 2.88 |
| Photoinitiator-3 | 1.92 | 1.92 | 1.92 | 1.92 | 1.92 | 1.92 | 1.92 | 1.92 | 1.92 | 1.92 | 1.92 | 1.92 |
| Levelling Agent | 0.29 | 0.29 | 0.29 | 0.29 | 0.29 | 0.29 | 0.29 | 0.29 | 0.29 | 0.29 | 0.29 | 0.29 |
| UV-Stabilizer | 0.1 | 0.1 | 0.1 | 0.1 | 0.1 | 0.1 | 0.1 | 0.1 | 0.1 | 0.1 | 0.1 | 0.1 |

For each of the Table 2 formulations, Table 3 provides the weight ratio of di-acrylated monomer to mono-acrylated monomer, and the weight ratio of di-acrylated monomer to tri-acrylated monomer in each of the twelve formulations.

TABLE 3

Formulation Acrylate Ratios

| Examples | Formulations | Diacrylated Monomer to Mono acrylate (Wt. % ratio) | Diacrylated Monomer to Triacrylated Monomer (Wt. % ratio) |
|---|---|---|---|
| Comp.13 | Formulation #1 | 2.58 | 4.00 |
| Comp.14 | Formulation #2 | 3.22 | 4.00 |
| Comp.15 | Formulation #3 | 2.15 | 4.00 |
| Comp.16 | Formulation #4 | 2.06 | 3.20 |
| 17 | Formulation #5 | 3.10 | 4.80 |
| Comp.18 | Formulation #6 | 2.58 | 5.00 |
| Comp.19 | Formulation #7 | 2.58 | 3.33 |
| Comp. 20 | Formulation #8 | 6.19 | 4.80 |
| Comp. 21 | Formulation #9 | 3.10 | 9.60 |
| 22 | Formulation #10 | 5.31 | 7.54 |
| 23 | Formulation #11 | 5.31 | 4.96 |
| 24 | Formulation #12 | 5.31 | 6.02 |

It will be noted each of Formulations #2, #5, #8, #9, #10, #11 and #12 had a weight ratio of di-acrylated monomer to mono-acrylated monomer between 1:1.3 and 1:6.2. Also, each of Formulations #5, #6, #8, #9, #10, #11 and #12 had a weight ratio of di-acrylated monomer to tri-acrylated monomer between 1:4.8 and 1:9.6.

Examples 26-36—Formulation Application and Curing

For the disclosed LED-curable digital ink formulations for printing to a substrate, each of the ink formulations was printed on a certain textile fabric by laying the formulation down using a drawdown bar #5, and subsequently cured by a COBRA Cure™ FX3 LED lamp (available from ProPhotonix Ltd., New Hampshire, USA) of 20 Watts and a wavelength of about 390 to about 395 nm, with two passes. The textile fabric substrate was 95% polyester and 5% spandex.

Standard Testing

Each of the twelve ink formulations laid down and cured onto the textile substrate creating the test specimen. Each test specimen was subjected to a plurality of standard tests for determining the performance of each that was used to assess the suitability of each for commercial use according to accepted industry tests.

Examples 25-36—Washing Testing

Table 4 reports washing testing data for each formulation laid down on the textile substrate, including the Delta-E ($\Delta E$) for each formulation when printed as noted herein. The washing testing was carried out in accordance with the Nike Test Method:

(1) The total weight of media and substrate was 2 kg. In this type of wash testing, the media is typically a fabric similar or identical to the substrate, and the media is used to simulate washing testing where multiple items are washed together. The media used was a 50:50 blend of cotton and polyester.

(2) A washing cycle was conducted on the media, where 12.5 grams of ECE (European Colorfastness Establishment) non-phosphate detergent A was used in the washing cycle, where the washing cycle was completed using a Miele front loader washing machine (Miele, Inc., located in Gütersloh, Germany) at 60° C. for 60 minutes. The wash water level was 12.5+/−1.5 L.

(3) A drying cycle was conducted on the media, during which media were dried for 50 minutes at a high level of setting, where the high level of setting was at a temperature of from about 65° C. to about 73° C.

Five cycles of the three-step wash testing were completed. Color measurements were done before and after the five cycles of the three-step washing test using an X-Rite instrument (X-Rite, Inc., located in Grand Rapids, MI).

The visual appearance of the fabric was observed for change in color and color staining. Each sample was assigned value for CIELAB (International Commission on Illumination) color space (L*a*b*), retention of color visual appearance, and color-to-fade (on a scale of from 0 (all color lost) to 5 (no fade)), as noted in Table 4.

TABLE 4

Washing Testing

| Ex. | Formulation Sample Code | Before Washing | | | After Washing | | | Delta E | Visual Appearance | Scale: 0 (all color lost) to 5 (No- fade) |
|---|---|---|---|---|---|---|---|---|---|---|
| | | L | a | b | L | a | b | | | |
| Comp. 25 | Formulation #1 | 22.08 | −1.79 | −18.26 | 34.58 | −3.78 | −19.54 | 12.72 | Fade | 2 |
| Comp. 26 | Formulation #2 | 24.59 | −3.38 | −20.32 | 32.77 | −4.46 | −21.51 | 8.34 | Fade | 2 |
| Comp. 27 | Formulation #3 | 24.05 | −3.15 | −17.97 | 33.49 | −5.11 | −20.4 | 9.94 | Fade | 2 |
| Comp. 28 | Formulation #4 | 22.98 | −2.04 | −16.39 | 33.31 | −5.47 | −16.68 | 10.89 | Fade | 2 |
| 29 | Formulation #5 | 22.92 | −3.36 | −18.24 | 33.45 | −5.35 | −17.58 | 10.74 | Retention of color | 3 |
| Comp. 30 | Formulation #6 | 23.52 | −3.65 | −17.85 | 32.84 | −5.69 | −18.3 | 9.55 | Retention of color | 3 |
| Comp. 31 | Formulation #7 | 26.25 | −4.89 | −19.52 | 39.91 | −7.91 | 15.94 | 38.12 | Fade | 1 |
| Comp. 32 | Formulation #8 | 23.73 | −0.87 | −19.25 | 34 | −3.12 | −22.15 | 10.91 | Fade | 2 |
| Comp. 33 | Formulation #9 | 23.92 | −1.66 | −19.52 | 32.5 | −3.39 | −20.24 | 8.78 | Fade | 2 |
| 34 | Formulation #10 | 24.1 | −1.3 | −21.04 | 35.15 | −3.41 | −20.86 | 11.25 | Fade | 2 |
| 35 | Formulation #11 | 24.82 | −0.8 | −23.11 | 28.69 | −2.9 | −23.31 | 4.41 | Retention of color | 3 |
| 36 | Formulation #12 | 25.26 | −1.51 | −20.24 | 29.23 | −2.25 | −21.22 | 4.16 | Retention of color | 3 |

According to these washing testing results, Formulations #5, #6, #11 and #12 gave an improved retention of color visual appearance over the other formulations. Further, Formulations #5, #6, #11 and #12 provided values of 3 on the color-to-fade scale.

Examples 37-48—Crock Testing

Wet crocking and dry crocking may be described as the transfer of dye from the material surface onto another surface due to rubbing. Wet crocking occurs when dyes bleed due to exposure to moisture. Dry crocking occurs when dyes bleed due to rubbing or exposure to another material.

Each of the twelve formulations was subjected to both dry crock testing and wet crock testing, as provided according to the American Association of Textile Chemists and Colorists (AATCC) Test Manual. The AATCC test used was AATCC TM8, except that results were reported as a Delta-E ($\Delta E$) color difference, as described below. The results are reported in Table 5.

For the dry crock test, the size of the crock square was about 5 cm (2 inches) by 5 cm (2 inches) and the size of the test specimen (the fabric substrate) was about 5 cm by 13 cm (2 inches by 5 inches). For the wet crock test, the size of the crock square was about 5 cm (2 inches) by 5 cm (2 inches) and the size of the test specimen was about 5 cm by 13 cm (2 inches by 5 inches).

During the wet crock testing, the dry crock square was weighed, and then distilled water was added, using a graduated pipette, at an amount of 0.65 times the weight of the crock square. For example, if the dry crock square weighed 0.24 grams, then 0.16 mL of distilled water would be used during the wet crock testing. Next, the test specimen for the wet crock testing was placed on an absorbent towel and wet thoroughly with distilled water to bring the wet crock specimen to about 65%+5% wetness by dry blotting with an absorbent towel. Then, the standard white cotton fabric crock square was rubbed against the surface of the test specimen in the wet crock testing, to determine whether any dye had been transferred from the test specimen to the crock square.

Figure 1D:
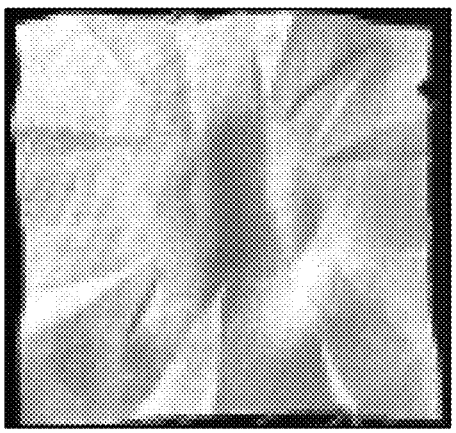

The dry crock testing and wet crock testing were carried out to determine the amount of color transferred from textile materials having the formulation laid out on the textile material surface to other surfaces by rubbing. Test procedures employed white crock squares, both dry and wet, as described above. For both the dry crock test and the wet crock test, there were 10 cycles. The instrument, an AATCC Crockmeter: Model: CM5 (available from SDL Atlas, LLC, South Carolina, USA) was motorized and set for 10 complete runs. Color was measured before and after the test using a spectrophotometer, and reported in Delta-E ($\Delta E$), which represents the total color distance between two colors. For instance, Delta-E ($\Delta E$) of 1.0 is the smallest color difference the human eye can see. The values in Table 5 represent the Delta-E ($\Delta E$) reported for each of the tests and formulations. FIG. 1 provides photos of the crock squares after both the dry crock testing and the wet crock testing for two of the twelve formulations, specifically Formulation #1 and Formulation #5. The top row reproduces photos of a crock square after dry crock testing of Formulation #1 (FIG. 1A), and after wet crock testing of Formulation #1 (FIG. 1B); and the bottom row reproduces photos of a crock square after dry crock testing of Formulation #5 (FIG. 1C), and after wet crock testing of Formulation #5 (FIG. 1D).

TABLE 5

Dry and Wet Crock Testing

| Examples | Formulations | Dry | Wet |
|---|---|---|---|
| Comp. 37 | Formulation #1 | 4.26 | 4.94 |
| Comp. 38 | Formulation #2 | 2.45 | 5.52 |
| Comp. 39 | Formulation #3 | 4.19 | 5.06 |
| Comp. 40 | Formulation #4 | 5.43 | 6.49 |
| 41 | Formulation #5 | 1.54 | 4.23 |
| Comp. 42 | Formulation #6 | 4.05 | 9.13 |
| Comp. 43 | Formulation #7 | 3.49 | 4.20 |
| Comp. 44 | Formulation #8 | 2.88 | 1.88 |
| Comp. 45 | Formulation #9 | 5.67 | 6.04 |
| 46 | Formulation #10 | 3.92 | 2.75 |
| 47 | Formulation #11 | 4.51 | 2.45 |
| 48 | Formulation #12 | 4.6 | 4.42 |

Examples 49-60—Leaching and Adhesion Testing

Leaching and adhesion testing for each of the twelve formulations are reported in Table 6. This leaching test was conducted on samples of the formulations, each in 20 grams of THF (tetrahydrofuran). Each sample was a 2.54 cm (1 inch) by 2.54 cm (1 inch) coated fabric, which was soaked for 30 seconds. Table 6 shows the results of leach testing on a scale of 0 to 5, where 0 represents leaching of colors and 5 represents no leaching of color. Based on this testing, Formulations #5, #9, #10, #11 and #12 are were improved over the other formulations, with these five formulations showing the least amount of leach out, with a value of 4 on the 0 to 5 scale.

All twelve formulations passed the adhesion testing, as indicated in Table 6. This adhesion testing was performed using Scotch® tape number 810 from 3M. For each adhesion test, a 2.54 cm (1 inch) length of the Scotch® 810 tape was cut and spread on the coated fabric. Pressure was applied by a tester's thumb through the surface of the tape. Finally, the tape was removed from each fabric piece and analyzed to determine whether or not some coating transferred from the fabric piece to the tape.

The result was a "pass" if no coating particles were observed on the removed tape.

TABLE 6

Leaching and Adhesion Testing

| Example | Formulation | Leach out | 0-5 Scale (0-Leach) (5-No Leach) | Adhesion |
|---|---|---|---|---|
| Comp. 49 | Formulation #1 | Major | 0 | Passed |
| Comp. 50 | Formulation #2 | Major | 0 | Passed |
| Comp. 51 | Formulation #3 | Major | 0 | Passed |
| Comp. 52 | Formulation #4 | Medium | 3 | Passed |
| 53 | Formulation #5 | Least | 4 | Passed |
| Comp. 54 | Formulation #6 | Major | 0 | Passed |
| Comp. 55 | Formulation #7 | Major | 0 | Passed |
| Comp. 56 | Formulation #8 | Major | 0 | Passed |
| Comp. 57 | Formulation #9 | Least | 4 | Passed |
| 58 | Formulation #10 | Least | 4 | Passed |
| 59 | Formulation #11 | Least | 4 | Passed |
| 60 | Formulation #12 | Least | 4 | Passed |

Examples 61-76—Curing Testing

Figure 2:
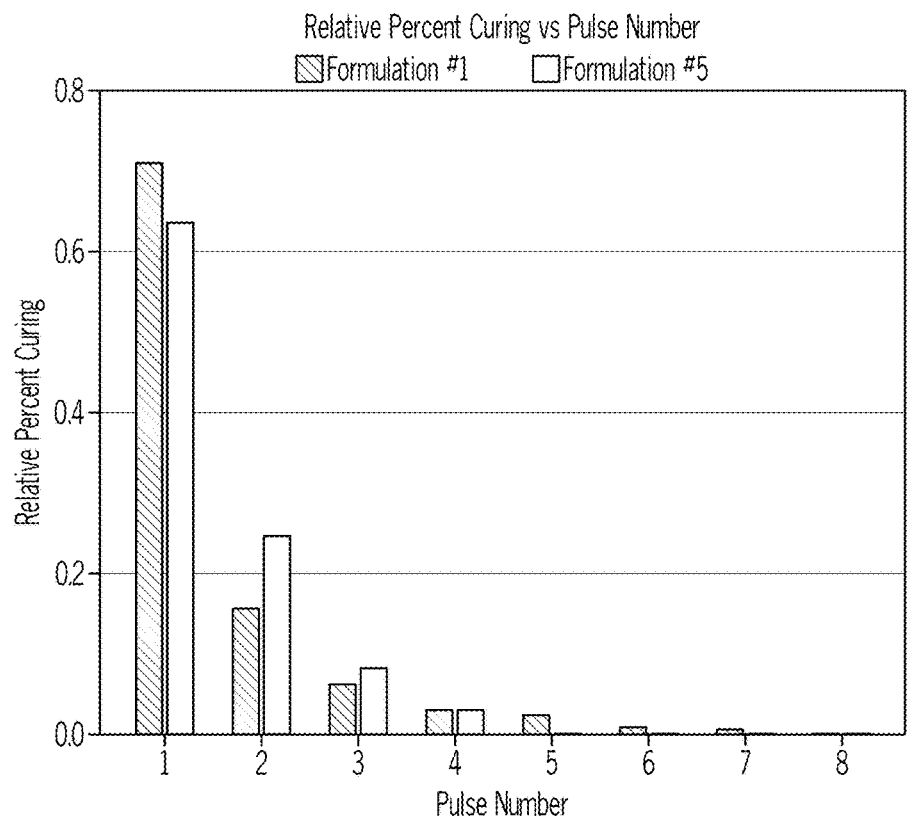
FIG. 2 is a graph showing curing test results for formulation #1 and formulation #5.
Figure 3:
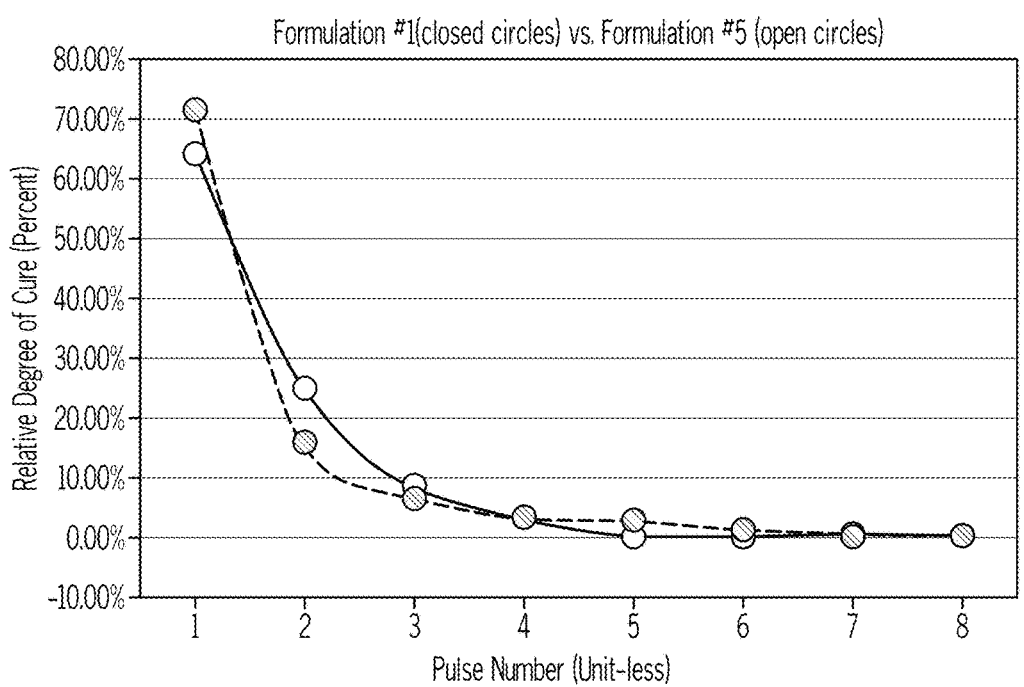
FIG. 3 is a plot showing curing pulse data for digital ink formulation #1 and formulation #5.

Curing test results are reported in graph form in FIGS. 2 and 3. These figures show the results of evaluating each of Formulation #1 and Formulation #5, using a photo differential scanning calorimeter ("Photo DSC") with a 365 nm LED light source. The Model Q200 DSC machine (TA Instruments, Inc., located in Delaware, USA) was attached to a modular photo-calorimeter accessory (PCA) (PCA Model: Q Series, available from TA Instruments, Inc., Delaware, USA) for the TA Instrument Q Series Differential Scanning calorimeters, with a technology that permits samples placed inside the DSC cell to be irradiated with UV light. Curing was performed for 3 seconds, with additional repetitions at intervals of once a minute. The Photo DSC measurements allowed for the determination of the "relative degree of surface curing." As reported in FIGS. 2 and 3, approximately 70% of the surface was cured during the first curing pulse (labeled with a "1" on the x-axis), while the cured surface percentage gradually diminished with each subsequent curing pulse until the surface was fully polymerized by the last curing pulse (labeled with an "8" on the x-axis).

More specifically, Table 7 provides the relative percent of curing (RPC) of each Photo DSC measurement for Formulation #1, for which relative percent of curing data are plotted in FIGS. 2 and 3.

TABLE 7

Relative Percent Curing of Formulation #1

| | Formulation #1 | | | |
|---|---|---|---|---|
| Example | Pulse Number | Enthalpy | Relative Enthalpy | Relative Percent of Curing |
| Comp. 61 | 1 | 68.8 | 57.27 | 63.95% |
| Comp. 62 | 2 | 33.58 | 22.05 | 24.62% |
| Comp. 63 | 3 | 19.02 | 7.49 | 8.36% |
| Comp. 64 | 4 | 14.28 | 2.75 | 3.07% |
| Comp. 65 | 5 | 11.53 | 0 | 0.00% |
| Comp. 66 | 6 | | 0 | 0.00% |
| Comp. 67 | 7 | | 0 | 0.00% |
| Comp. 68 | 8 | | 0 | 0.00% |
| | | | Total Relative Enthalpy: 89.56 | |

Further, Table 8 provides the relative percent of curing (RPC) of each Photo DSC measurement for Formulation #5, for which relative percent of curing data also are plotted in FIGS. 2 and 3.

TABLE 8

Relative Percent Curing of Formulation #5

| | Formulation #5 | | | |
|---|---|---|---|---|
| Example | Pulse Number | Enthalpy | Relative Enthalpy | Relative Percent of Curing |
| 69 | 1 | 82.11 | 68.67 | 71.12% |
| 70 | 2 | 28.44 | 15 | 15.54% |
| 71 | 3 | 19.59 | 6.15 | 6.37% |
| 72 | 4 | 16.53 | 3.09 | 3.20% |
| 73 | 5 | 15.81 | 2.37 | 2.45% |
| 74 | 6 | 14.33 | 0.89 | 0.92% |
| 75 | 7 | 13.82 | 0.38 | 0.39% |
| 76 | 8 | 13.44 | 0 | 0.00% |
| | | | Total Relative Enthalpy: 96.55 | |

In addition to providing data point values for each of pulse numbers 1 through 8, Table 7 and Table 8 report enthalpy, relative enthalpy, and the total relative enthalpy for Formulation #1 and Formulation #5, respectively. This illustrates the enthalpy at each measurement, the relative enthalpy, and the advantageous total relative enthalpy achieved by Formulation #5 over that of Formulation #1.

In summary, these data illustrate that particularly advantageous results were achieved with the use of the LED-curable digital ink formulation and method according to the present disclosure. Illustrated by the data is the significance of the ratios and ratio ranges described herein, with regard to the ability to achieve improved performance in terms of curing of the ink formulation, and attendant exceptional testing results that are of considerable value, particularly in commercial operations, and in providing finished products that are durable and retain much of their originally manufactured characteristics during assembly, use, handling, cleaning and washing.

Examples 77-84—Residual Monomer

Formulations #1, #5, #10 and #12 were printed onto badger fabric (100% polyester) and canvas fabric (50% polyester+25% cotton+25% rayon) substrates. The printer settings used are shown in Table 9. The formulations on the fabric substrates were each cured, and the amount of total residual monomer remaining after curing was measured by using an Agilent 5975C (inert XL MD) with Triple-Axis Detector gas chromatography (GC) (available from Agilent Technologies, Inc., California, USA), and recorded in Table 10.

TABLE 9

Printer Parameters

| | | Input Printing Variables | | | | |
|---|---|---|---|---|---|---|
| Examples | Formulations | Head Speed | Printing Passes | Uni/Bi | Distance Between lamp and platen | Jetting Temp. |
| Comp. 77 | Formulation #1 | High | 730*1200 | Bi | 1.8 cm | 46 C. |
| 78 | Formulation #5 | High | 730*1200 | Bi | 1.8 cm | 46 C. |
| 79 | Formulation #10 | High | 730*1200 | Bi | 1.8 cm | 46 C. |
| 80 | Formulation #12 | High | 730*1200 | Bi | 1.8 cm | 46 C. |

TABLE 10

Residual Monomer

| Examples | Formulations | Ratio HD(EO) DA/LA (Wt % ratio) | Ratio HD(EO) DA/ TMPTA (Wt % ratio) | Total Monomer (PPM) Badger Fabric | Total Monomer (PPM) Canvas Fabric |
|---|---|---|---|---|---|
| Comp. 81 | Formulation #1 | 2.58 | 4.00 | 1460 | 744 |
| 82 | Formulation #5 | 3.10 | 4.80 | 116 | 135 |
| 83 | Formulation #10 | 5.31 | 7.54 | 134 | 152 |
| 84 | Formulation #12 | 5.31 | 6.02 | 166 | 132 |

What is claimed is:

1. A formulation for printing to a substrate, consisting essentially of:
a combination of monomers, the combination consists of:
at least one mono-acrylated monomer,
at least one di-acrylated monomer,
at least one tri-acrylated monomer, and
at least one polyalkoxylated acrylate monomer;
at least one photoinitiator;
at least one pigment dispersion;
at least one leveling agent; and
at least one inhibitor;
wherein a weight ratio of the di-acrylated monomer to the mono-acrylated monomer is from about 3.3 to about 6.0;
wherein a weight ratio of the di-acrylated monomer to the tri-acrylated monomer is from about 4.5 to about 8.0; and
wherein the formulation is an LED-curable digital ink.

2. The formulation of claim 1, wherein the mono-acrylated monomer is selected from the group consisting of lauryl acrylate, caprolactam acrylate, isodecyl acrylate, tetra hydrofurfuryl acrylate, cyclic trimethylolpropane formyl acrylate, 4-tert butylcyclohexyl acrylate, and any combination thereof.

3. The formulation of claim 1, wherein the di-acrylated monomer is selected from the group consisting of 1,6 hexanediol ethoxylated diacrylate, 1,6 hexanediol diacrylate (HD), 1,10 deconediol diacrylate, dipropylene glycol diacrylate, tripropylene glycol diacrylate, and any combination thereof.

4. The formulation of claim 1, wherein the tri-acrylated monomer is selected from the group consisting of trimethylolpropane triacrylate, trimethylolpropane (EO)3 triacrylate, trimethylolpropane (EO)6 triacrylate, trimethylolpropane (EO)9 triacrylate, trimethylolpropane (EO)15 triacrylate, pentaerythritol triacrylate, and any combination thereof.

5. The formulation of claim 1, wherein the formulation is LED cured at a power of from about 8 watts to about 20 watts and a wavelength of from about 380 nm to about 400 nm.

6. The formulation of claim 1, wherein the substrate is selected from the group consisting of fabric, paper, wood, metal, glass, plastic, and any combination thereof.

7. The formulation of claim 1, wherein the combination of monomers is radically curable.

8. A method of bonding a digital ink formulation onto a substrate, comprising:
at least partially disposing a digital ink formulation having a pattern or an indicia onto a substrate,
wherein the digital ink formulation consisting essentially of combination of monomers, the combination consists of:
at least one mono-acrylated monomer;
at least one di-acrylated monomer; and
at least one tri-acrylated monomer;
at least one polyalkoxylated acrylate monomer,
at least one photoinitiator;
at least one pigment dispersion;
at least one leveling agent; and
at least one inhibitor;
wherein a weight ratio of the di-acrylated monomer to the mono-acrylated monomer is from about 3.3 to about 6.0;
wherein a weight ratio of the di-acrylated monomer to the tri-acrylated monomer is from about 4.5 to about 8.0; and
wherein an LED curing of the digital ink formulation on the substrate at least partially transfers the pattern or the indicia to the substrate to provide a modified substrate.

9. The method of claim 8, wherein the at least partially disposing comprises printing on the substrate.

10. The method of claim 8, wherein the substrate is selected from the group consisting of fabric, paper, wood, metal, glass, plastic, and any combination thereof.

11. The method of claim 8, wherein the substrate is a fabric.

12. The method of claim 8, wherein the digital ink formulation enhances at least one of washing testing performance, dry crock testing performance, wet crock testing performance, and leaching testing performance.

13. The method of claim 8, wherein the formulation is LED cured at a power of from about 8 watts to about 20 watts and a wavelength of about 380 nm to about 400 nm.

14. The method of claim 8, wherein the curing of the digital ink formulation is characterized by a total relative enthalpy of at least 90 J/kg.

15. The method of claim 8, wherein the cured digital ink formulation has a total amount of residual monomer of no more than 500 ppm.

16. The method of claim 8, wherein the cured digital ink formulation has a total amount of residual monomer of no more than 200 ppm.

17. An article comprising a fabric substrate modified according to the method of claim 8.

18. The formulation of claim 1, wherein the at least one di-acrylated monomer has a molecular weight of at least 225 g/mol, an acid value of less than 0.7 kOH/g, and a viscosity from about 0.5 to about 30 mPa at temperature of 25° C.

19. The formulation of claim 1, wherein the at least one tri-acrylated monomer has a molecular weight of at least 275 g/mol, an acid value of less than 0.4 kOH/g, and a viscosity from about 20 to about 150 mPa at temperature of 25° C.

* * * * *